US012474154B2

(12) United States Patent
Pichler et al.

(10) Patent No.: US 12,474,154 B2
(45) Date of Patent: Nov. 18, 2025

(54) INDUCTIVE POSITION SENSOR COMPRISING AT LEAST ONE TRANSMIT COIL, AN ABSOLUTE POSITION RECEIVE COIL PAIR, A HIGH-RESOLUTION POSITION RECEIVE COIL PAIR AND A CONDUCTIVE MOVING TARGET

(71) Applicant: Renesas Electronics America Inc., Milpitas, CA (US)

(72) Inventors: Rudolf Pichler, Stallhofen (AT); Andreas Buchinger, Waldhofen/Ybbs (AT); Ruggero Leoncavallo, Gratkorn (AT); Bence Gombor, Graz (AT); Harald Hartl, Graz-Strassgang (AT)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 18/618,193

(22) Filed: Mar. 27, 2024

(65) Prior Publication Data
US 2024/0230307 A1 Jul. 11, 2024

Related U.S. Application Data

(63) Continuation of application No. 17/371,908, filed on Jul. 9, 2021, now abandoned.

(30) Foreign Application Priority Data

Jul. 10, 2020 (EP) ..................................... 20185164
Jun. 10, 2021 (EP) ..................................... 21178772

(51) Int. Cl.
G01B 7/00 (2006.01)
G01D 5/20 (2006.01)
H01F 5/00 (2006.01)

(52) U.S. Cl.
CPC ............ *G01B 7/003* (2013.01); *G01D 5/2053* (2013.01); *G01D 5/2073* (2013.01); *H01F 5/003* (2013.01)

(58) Field of Classification Search
CPC .... G01D 5/2053; G01D 5/2073; G01B 7/003; H01F 5/003
See application file for complete search history.

(56) References Cited

U.S. PATENT DOCUMENTS 7,719,264 B2  5/2010 Tiemann
2004/0227644 A1  11/2004 Lin et al.
(Continued)

FOREIGN PATENT DOCUMENTS

JP  2008089591 A  4/2008

OTHER PUBLICATIONS

Decision of Rejection dated Feb. 4, 2025 received in Japanese Patent Application No. 2021-114325.

*Primary Examiner* — Eman A Alkafawi
*Assistant Examiner* — Suresh K Rajaputra
(74) *Attorney, Agent, or Firm* — SCULLY, SCOTT, MURPHY & PRESSER, P.C.

(57) ABSTRACT

An inductive position sensor including at least one transmit coil, an absolute position receive coil pair, a high-resolution position receive coil pair and a conductive moving target, the absolute position receive coil pair and the high-resolution receive coil pair together define a measurement area of the inductive position sensor and the moving target can move in this measurement area, the absolute position coil pair has a first sine receive coil and a first cosine receive coil, both having one period over the measurement area of the inductive position sensor, the high-resolution position receive coil pair has a second sine receive coil and a second cosine receive coil, both having at least two periods over the
(Continued)

measurement area of the inductive position sensor, the absolute position receive coil pair and the high-resolution position receive coil pair are arranged in the same area of a printed-circuit board of the inductive position sensor.

9 Claims, 9 Drawing Sheets

(56) References Cited

U.S. PATENT DOCUMENTS

| | | | | |
|---|---|---|---|---|
| 2015/0211895 | A1* | 7/2015 | Reitsma | G01D 5/202 |
| | | | | 324/207.16 |
| 2016/0169717 | A1* | 6/2016 | Zhitomirsky | G01D 5/142 |
| | | | | 702/94 |
| 2018/0274591 | A1* | 9/2018 | Maniouloux | G01P 3/443 |
| 2018/0274946 | A1* | 9/2018 | Maniouloux | G01D 5/2046 |
| 2018/0274948 | A1* | 9/2018 | Maniouloux | G01D 5/2053 |
| 2019/0331541 | A1* | 10/2019 | Janisch | G01D 5/2053 |

* cited by examiner

INDUCTIVE POSITION SENSOR COMPRISING AT LEAST ONE TRANSMIT COIL, AN ABSOLUTE POSITION RECEIVE COIL PAIR, A HIGH-RESOLUTION POSITION RECEIVE COIL PAIR AND A CONDUCTIVE MOVING TARGET

CROSS-REFERENCE TO RELATED APPLICATIONS

The subject application claims priority to European Patent Application No. EP20185164.9, filed on Jul. 10, 2020, and European Patent Application No. EP21178772.6, filed on Jun. 10, 2021. The subject application is a continuation of U.S. patent application Ser. No. 17/371,908, filed on Jul. 9, 2021.

The disclosures of European Patent Application No. EP20185164.9, European Patent Application No. EP21178772.6 and U.S. patent application Ser. No. 17/371,908 are incorporated herein by this reference.

BACKGROUND

The invention relates to an inductive position sensor comprising at least one transmit coil, an absolute position receive coil pair, a high-resolution position receive coil pair and a conductive moving target. The invention further relates to a use of such an inductive position sensor.

Inductive position sensors are very popular because of their robustness against environmental influences. Especially for through-shaft applications the inductive sensors are attractive because of the design flexibility in coil design which easily allows to adapt for example on-axis and off-axis position sensing applications.

These benefits are a big advantage in many industrial or automotive applications. But often for industrial or robotics applications a higher output resolution is needed which only one absolute inductive position sensor is not capable of. As well some automotive applications require absolute high-resolution sensors like steering sensors or sensors for wheel hub traction motors.

An inductive position sensor setup usually consists of a sensor printed circuit board (PCB) inside a housing and a conductive target moving near to the sensor.

The sensor PCB includes a signal conditioning and processing unit which is usually an application-specific integrated circuit (ASIC) and a sensor coil system connected to the ASIC. The sensor coil system consisting of one or more transmit coils and one or more receive coils. Typically, there is one transmitter coil and two receiver coils. The two receiver coils are arranged such that one generates a sine and the other a cosine signal every 360° mechanical rotation of the target for a rotational position sensor. This configuration provides the absolute position of the target (absolute embodiment). By increasing the number of receiver coil pattern over the 360° and an appropriate target configuration it is possible to increase the mechanical accuracy and resolution of the measurement per rotation by generating a number of signal repetition equal to the number of physical repetition of the sine and cosine signal repetitions (multi-period embodiment). In contrast by using such a method the absolute position of the target gets lost Generally, state of the art sensor can be implemented by using two separate absolute and incremental sensors and separate targets or by using two separate coil systems next to each other, but such implementation has quite high space requirement.

The drawbacks of separate sensors are for example: Thicker sensor, 2×PCB, 2×target, additional wiring to connect to the evaluation unit—MCU, leads to higher cost. The drawbacks of separate coils next to each other are for example: size of the PCB (cost), limited chances to scale it down.

It is therefore an object of the present invention to provide an inductive position sensor providing absolute and high-resolution position data and requiring minimum space on a printed-circuit board.

SUMMARY

According to the invention the object is solved by an inductive position sensor comprising at least one transmit coil, an absolute position receive coil pair, a high-resolution position receive coil pair and a conductive moving target, wherein the absolute position receive coil pair and the high-resolution receive coil pair together define a measurement area of the inductive position sensor and the moving target can move in this measurement area, wherein the absolute position coil pair has a first sine receive coil and a first cosine receive coil, both having one period over the measurement area of the inductive position sensor, wherein the high-resolution position receive coil pair has a second sine receive coil and a second cosine receive coil, both having at least two periods over the measurement area of the inductive position sensor, wherein the absolute position receive coil pair and the high-resolution position receive coil pair are arranged in the same area of a printed-circuit board of the inductive position sensor.

The invention describes a new way of combining a lower resolution absolute sensor with a high-resolution incremental sensor. Generally, it is simply possible by just using a combination of an absolute inductive position sensor next to an incremental high-resolution position sensor, but this approach needs a lot of space which is typically not available.

This invention is about an innovative embodiment which consists of overlapping the absolute position sensor with the multi-period high-resolution sensor to increase the mechanical accuracy and resolution without losing the absolute position. As a result a high-accuracy, high-resolution absolute sensor can be designed.

The new implementation according to the invention incorporates both absolute and high-resolution coil at the same PCB area.

The benefits are for example:
Implementation within smaller space possible: 1×PCB, 1×target, evaluation unit can be located on the same PCB, much easier to scale it physically down;
On-axis, through-shaft and side-shaft applications are possible;
Redundant implementation is possible;
High robustness against environmental influences;
Immune against magnetic strayfields;
Higher output resolution compared to an absolute position sensor without high resolution coil.

Pursuant to a variant of the invention the inductive position sensor is a radial position sensor and the measurement area is a 360° circle.

According to an alternative variant of the invention the inductive sensor is a linear position sensor and the measurement area is a straight line.

In a preferred variant the inductive position sensor comprises a signal processing unit, for providing a signal to the at least one transmit coil and/or for processing the signals of the absolute position receive coil pair and the high-resolution receive coil pair. The signal processing unit is arranged on the same printed-circuit board as the inductive position sensor or externally connected to the printed-circuit board of the inductive position sensor.

The sensor configuration can be used with different target configuration. The performance of the implementation strongly depends on the target configuration.

In an advantageous variant of the invention the conductive target comprises multiple sections spaced apart from each other. Preferably, the multiple sections of the conductive moving target have the same shape and/or spacing.

According to a preferred variant of the invention the moving target comprises at least one first target element and at least one second target element, wherein the shape of the at least one first target element is different to the shape of the at least one second target element. The at least one first target element and the at least one second target element are preferably arranged on a common substrate, like a printed-circuit board. For example, the first target element and/or the second target element comprise multiple sections.

In a particularly preferred variant of a radial inductive position sensor according to the invention the radial area covered by the at least one first target element, particularly of each section of the at least one first target element, is constant in the radial direction, i.e. the width of each section increases constantly from the center to the radial outside.

Pursuant to a variant of the invention the at least one first target element, particularly the multiple sections of the at least one first target element, covers the complete measurement area of the inductive position sensor or the measurement area of the inductive position sensor not covered by the at least one second target element.

According to a variant of the invention the at least one second target element covers a part of the measurement area of the inductive position sensor. Preferably, the at least one second target element has a semi-circular shape, an arc segment of a full ring shape, a rectangular shape or an arrow shape.

In a particularly preferred variant of a radial inductive position sensor according to the invention the radial area covered by the at least one second target element changes in the radial direction, i.e. for example the width of the at least one second target element is constant in the radial direction (rectangular) or changes in a rate different than the radially covered area (arrow).

Pursuant to a variant of the invention the at least one first target element and the at least one second target element are arranged next to each other or are at least partially overlapping each other.

In a further variant of the invention the at least one first target element and the at least one second target element are totally overlapping but having different sizes. Particularly, one target element is bigger than the other target element, so that the bigger target element completely covers the smaller target element.

The invention further relates to a use of an inductive position sensor according to the invention together with another inductive position sensor according to the invention or any other position sensor to calculate further output signals such as torque, diagnostic information or error compensation.

BRIEF DESCRIPTION OF THE SEVERAL VIEWS OF THE DRAWINGS

In the following the invention will be further explained with respect to the embodiments shown in the attached figures. It shows.

DETAILED DESCRIPTION

Figure 1:
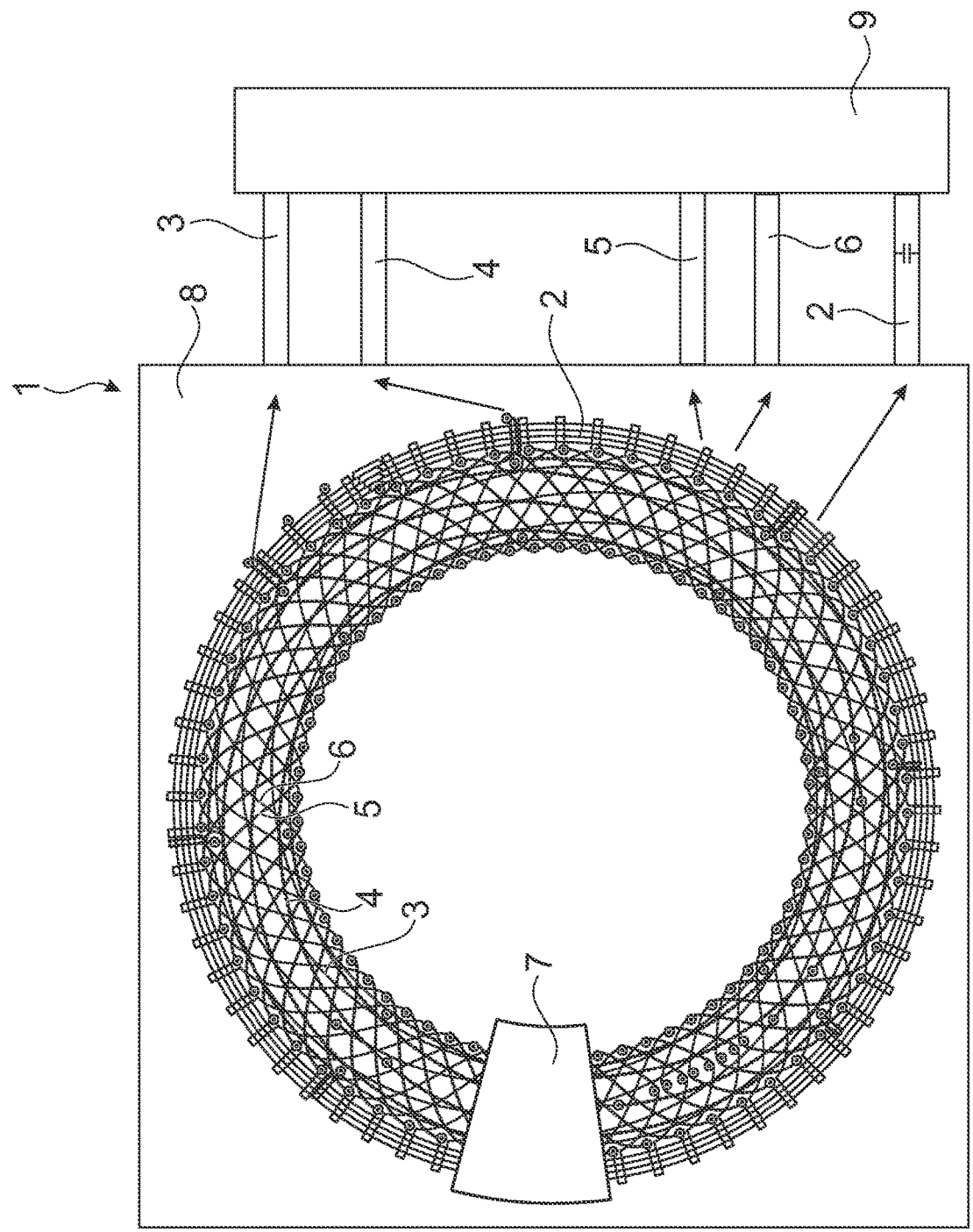
FIG. 1 a schematic view of a first embodiment of an inductive position sensor according to the invention.

FIG. 1 shows a schematic view of a first embodiment of an inductive position sensor 1 according to the invention. The inductive position sensor 1 comprises a transmit coil 2, an absolute position receive coil pair 3, 4, a high-resolution receive coil pair 5,6 and a conductive moving target 7. The absolute position receive coil pair 3, 4 and the high-resolution receive coil pair 5, 6 together define a measurement area of the inductive position sensor 1 and the moving target 7 can move in this measurement area. The first embodiment shown in FIG. 1 refers to a radial inductive position sensor 1 and the measurement area is a 360° circle.

The absolute position coil pair 3, 4 has a first sine receive coil 3 and a first cosine receive coil 4, both 3, 4 having one period over the measurement area of the inductive position sensor 1.

The high-resolution position receive coil pair 5, 6 has a second sine receive coil 5 and a second cosine receive coil 6, both 5, 6 having at least two periods over the measurement area of the inductive position sensor 1. According to the embodiment shown in FIG. 1 the second sine receive coil 5 and a second cosine receive coil 6 each have 8-periods over the measurement area.

According to the present invention the absolute position receive coil pair 3, 4 and the high-resolution position receive coil pair 5, 6 are arranged in the same area of a printed-circuit board 8 of the inductive position sensor 1.

The inductive position sensor 1 shown in FIG. 1 further comprises a signal processing unit 9, for providing a signal to the at least one transmit coil 2 and for processing the signals of the absolute position receive coil pair 3, 4 and the high-resolution receive coil pair 5, 6. According to the embodiment shown in FIG. 1 the signal processing unit 9 is externally connected to the printed-circuit board 8 of the inductive position sensor 1. In an alternative embodiment of the invention the signal processing unit 9 is arranged on the same printed-circuit board 8 as the inductive position sensor 1. The connections between the signal processing unit 9 and the transmit coil 2, the absolute position receive coil pair 3, 4 and the high-resolution receive coil pair 5, 6 have been numbered identically to the respective coil. During use of the inductive position sensor 1 shown in FIG. 1 the signal processing unit 9 provides an excitation current to the transmit coil 2, which creates an electro-magnetic field due to the excitation current. The conductive moving target 7 is located inside this created electro-magnetic field of the transmit coil 2 and therefore modifies the electro-magnetic field due to eddy currents induced into the conductive moving target 7. The absolute position receive coil pair 3, 4 and the high-resolution receive coil pair 5, 6 can sense the modifications in the electro-magnetic field due to the conductive moving target 7 and the position of the conductive moving target 7. The signals of the absolute position receive coil pair 3, 4 and the high-resolution receive coil pair 5, 6 are used by the signal processing unit 9 to determine the absolute position and the high-resolution position of the conductive moving target 7 in the measurement area.

Figure 2:
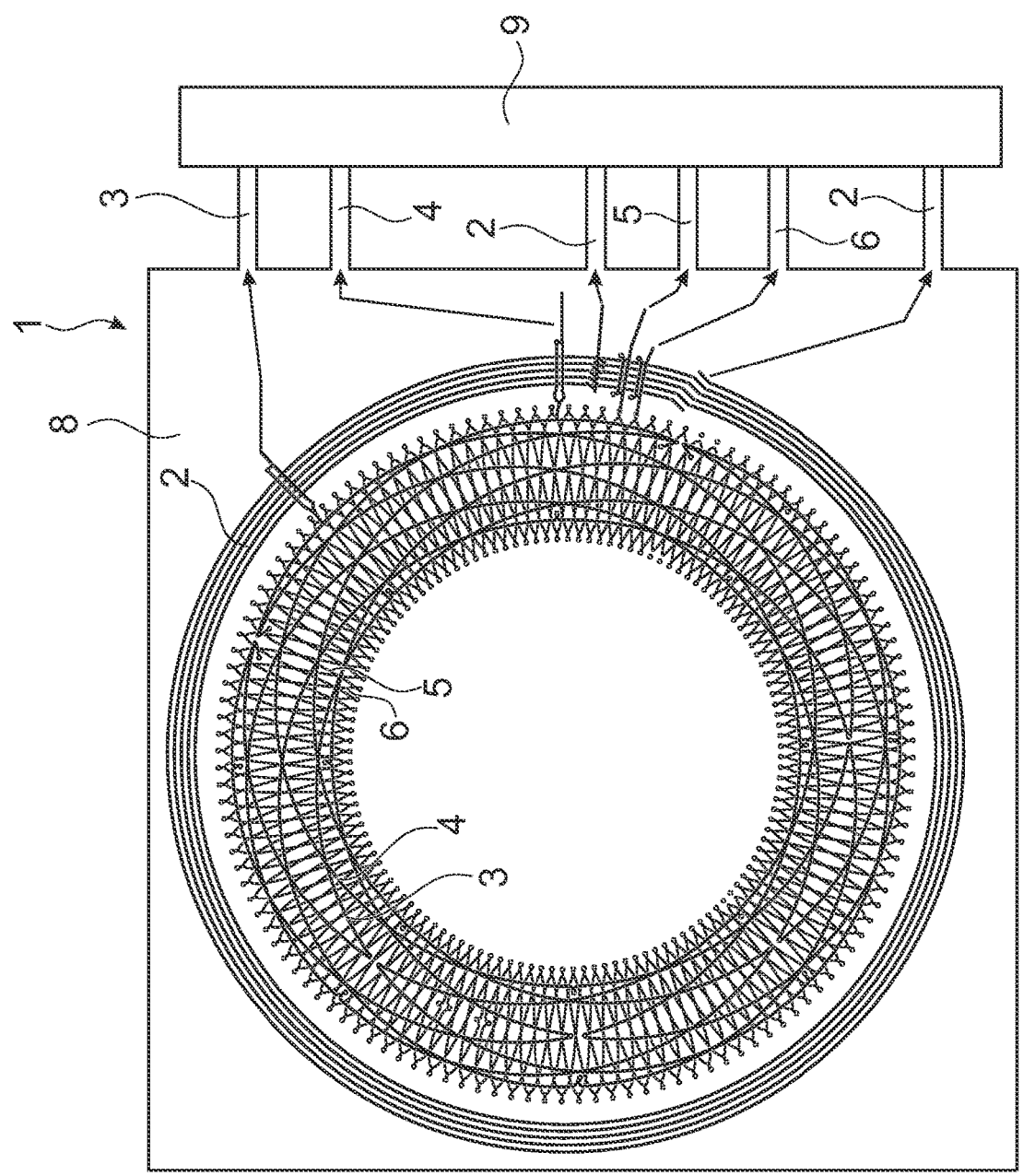
FIG. 2 a schematic view of a second embodiment of an inductive position sensor according to the invention.

FIG. 2 shows a schematic view of a second embodiment of an inductive position sensor 1 according to the invention. The second embodiment shown in FIG. 2 differs from the first embodiment shown in FIG. 1 in that the inductive position sensor comprises two transmit coils 2 and in that the second sine receive coil 5 and a second cosine receive coil 6 each have 32-periods over the measurement area. Otherwise, the second embodiment corresponds to the first embodiment.

The implementation of a high-resolution absolute sensor 1 with a 32-periodic receive coil pair 5, 6, an absolute 1×360 deg receive coil pair 3,4, two separate transmitter coils 2 and a signal processing unit 9 with two inductive position sensor ICs (not shown) with a 12 bit signal acquisition the theoretic resolution is 32×12 bit which is 131072 counts or 17 bit.

It is known that the sensor linearity will be lower depending on system configuration and tolerances.

The implementation of the high-resolution absolute sensor 1 with a 32-periodic receive coil pair 5, 6, a 1×360 absolute receive coil pair 3,4 and one shared signal processing unit 9 is shown in FIG. 2.

Figure 3:
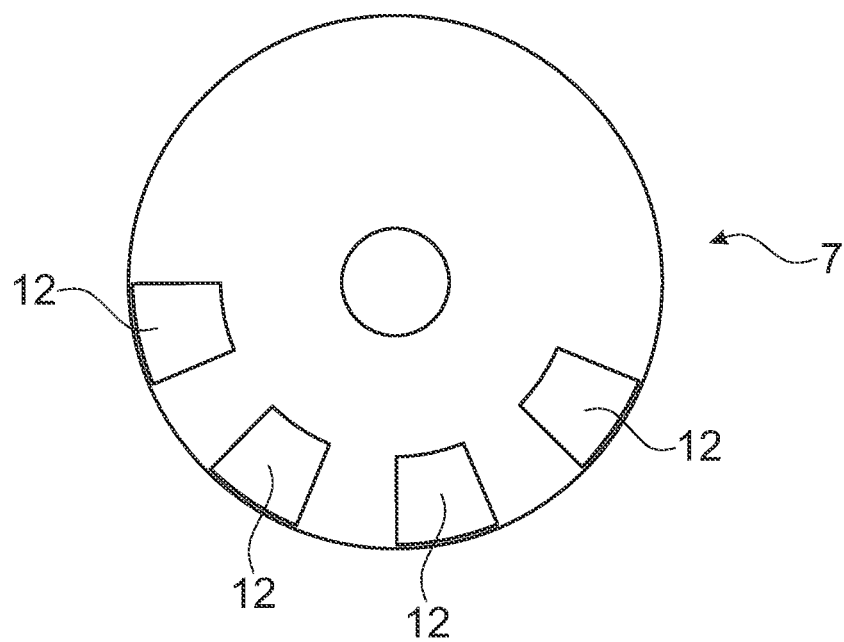
FIG. 3 a first embodiment of a conductive moving target.

Generally the target must be designed to generate signal for both high-resolution receive coil pair 5, 6 and absolute position receive coil pair 3, 4. The accuracy and robustness over tolerances will depend on the target configuration. Below are some implementation examples. FIG. 3 shows a first embodiment of a conductive moving target 7. The conductive moving target 7 comprises multiple sections 12 spaced apart from each other. The multiple sections 12 of the conductive moving target 7 have the same shape and spacing. One or more portions of the incremental n-period sensor target 7 are removed to generate sufficient signal on the 1-periodic absolute position receive coil pair 3, 4.

Figure 4:
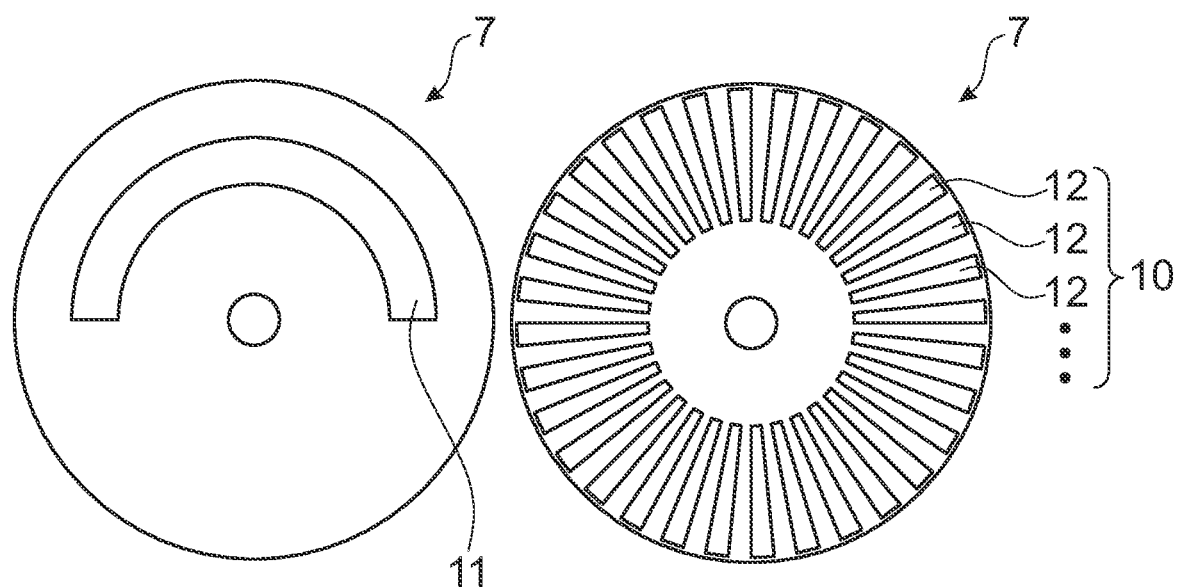
FIG. 4 a second embodiment of a conductive moving target.

FIG. 4 shows a second embodiment of a conductive moving target 7. FIG. 4 shows the upper and lower side of a substrate, wherein one side comprises a first target element 10 and the other side comprises a second target element 11, wherein the shape of the first target element 10 is different to the shape of the at least one second target element 11. Particularly, the first target element 10 comprises multiple sections 12, spaced apart from each other. The multiple sections 12 of the conductive moving target 7 have the same shape and spacing and cover the complete circumference of the circular substrate building the conductive moving target 7. Thus, the multiple sections 12 of the first target element 10 cover the complete measurement area of the inductive position sensor 1. The second target element 11 has a semi-circular shape and overs a half-circle of the circular substrate of the conductive moving target 7. The first element 10 and second element 11 of the conductive moving target 7 overlap with each other, as FIG. 4 shows the two sides of the same substrate of the same conductive moving target 7. Thus, FIG. 4 shows high-resolution segments 12 for the n-periodic receive coil pair 5, 6 and stacked target 11 for the 1-periodic absolute position receive coil pair 3, 4.

Figure 5:
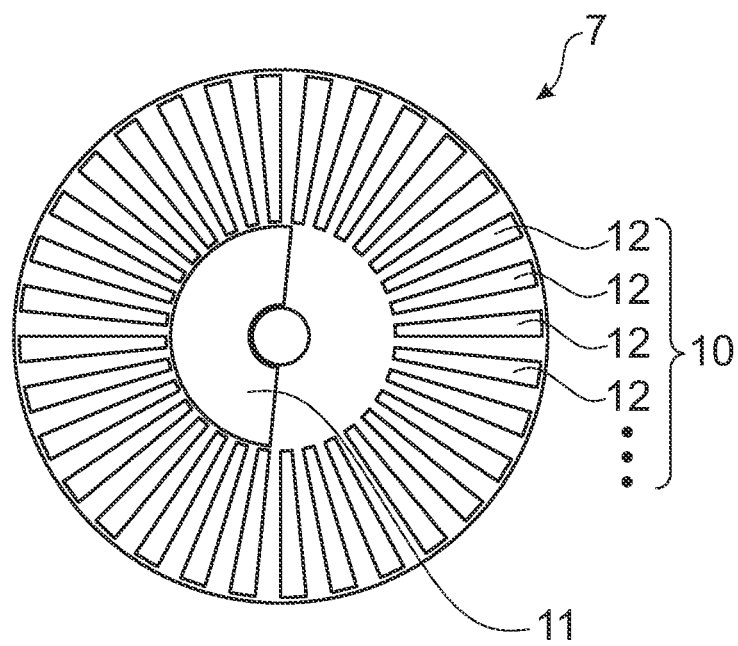
FIG. 5 a third embodiment of a conductive moving target.

FIG. 5 shows a third embodiment of a conductive moving target 7. The third embodiment of the conductive moving target 7 shown in FIG. 5 differs from the second embodiment of the conductive moving target 7 shown in FIG. 4 in that the second element 11 has the shape of an arc segment of a full ring, which is arranged on the same side as the first element 10 comprising the segments 12. Furthermore, the first element 10 and the second element 11 of the conductive moving target 7 are arranged next to each other, particularly the second element 11 is arranged inside the first element 10, and the first element 10 and the second element 11 do not overlap.

Figure 6:
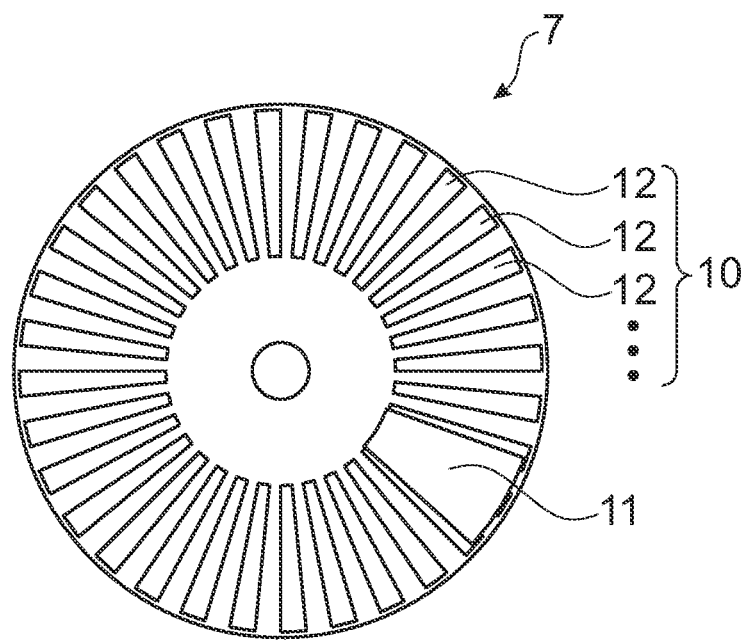
FIG. 6 a fourth embodiment of a conductive moving target.

FIG. 6 shows a fourth embodiment of a conductive moving target 7. The fourth embodiment of the conductive moving target 7 shown in FIG. 6 differs from the third embodiment of the conductive moving target 7 shown in FIG. 5 in that the second element 11 has a rectangular shape and overlaps with the first element 10. Particularly, the first element 10 comprising the segments 12 completely overlaps the second element 11 if the gaps between the segments 12 are considered to belong to the first element 10.

Figure 7:
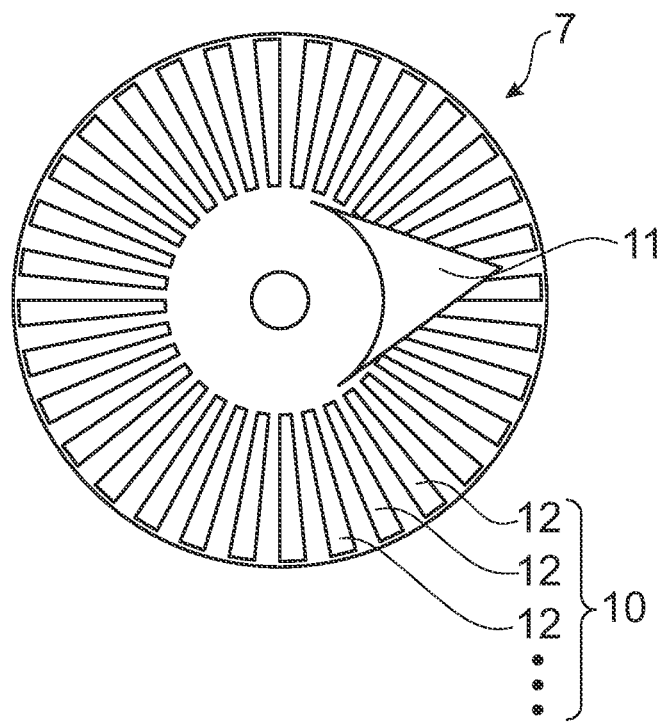
FIG. 7 a fifth embodiment of a conductive moving target.

FIG. 7 shows a fifth embodiment of a conductive moving target 7. The fifth embodiment of the conductive moving target 7 shown in FIG. 7 differs from the fourth embodiment of the conductive moving target 7 shown in FIG. 6 in that the second element 11 has the shape of an arrow.

Figure 8:
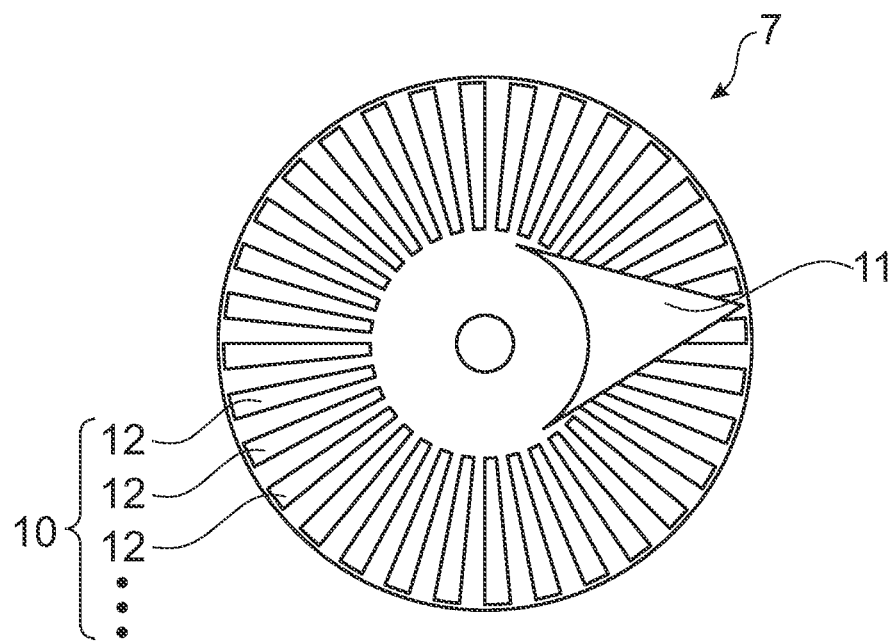
FIG. 8 a sixth embodiment of a conductive moving target.

FIG. 8 shows a sixth embodiment of a conductive moving target 7, wherein the second element 11 has a bigger arrow shape compared to the fifth embodiment shown in FIG. 7.

Figure 9A:
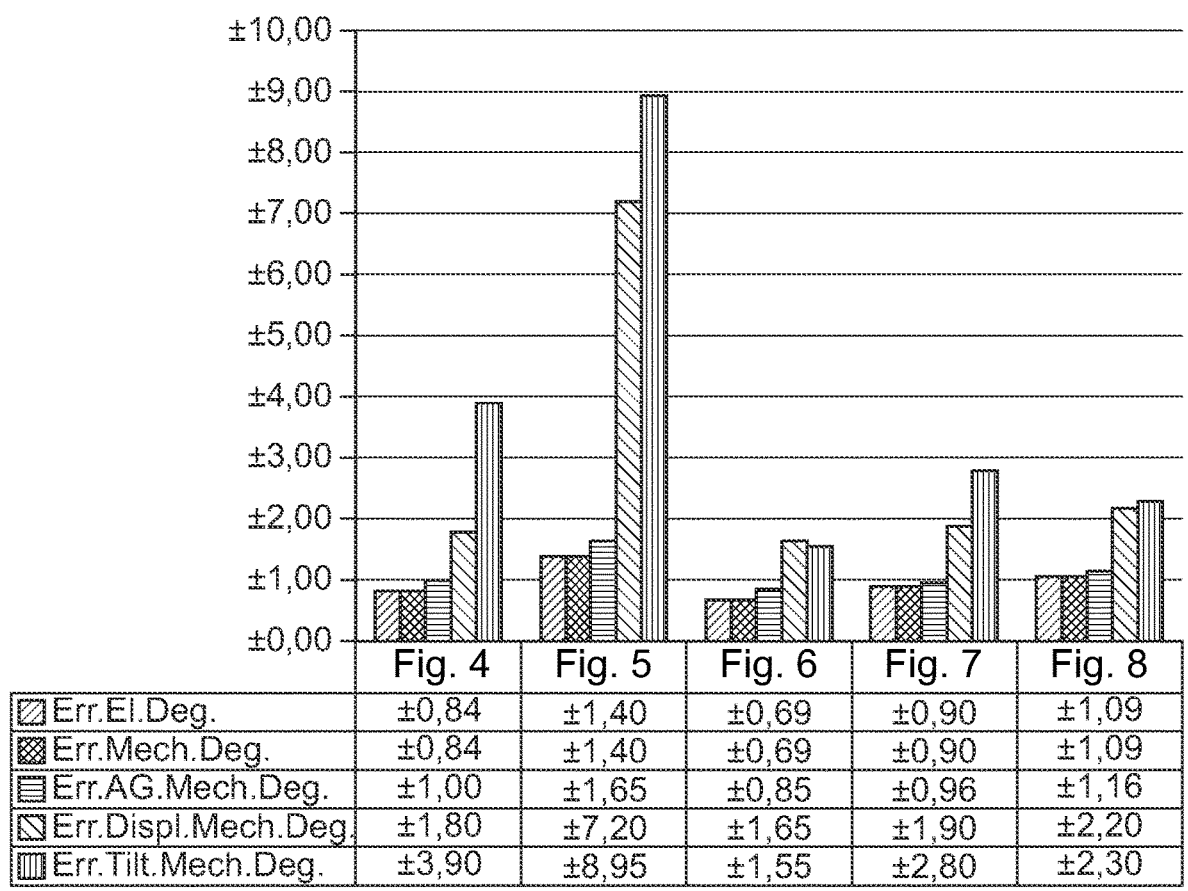
FIGS. 9a, 9b performance comparisons for different embodiments of the conductive moving target.
Figure 9B:
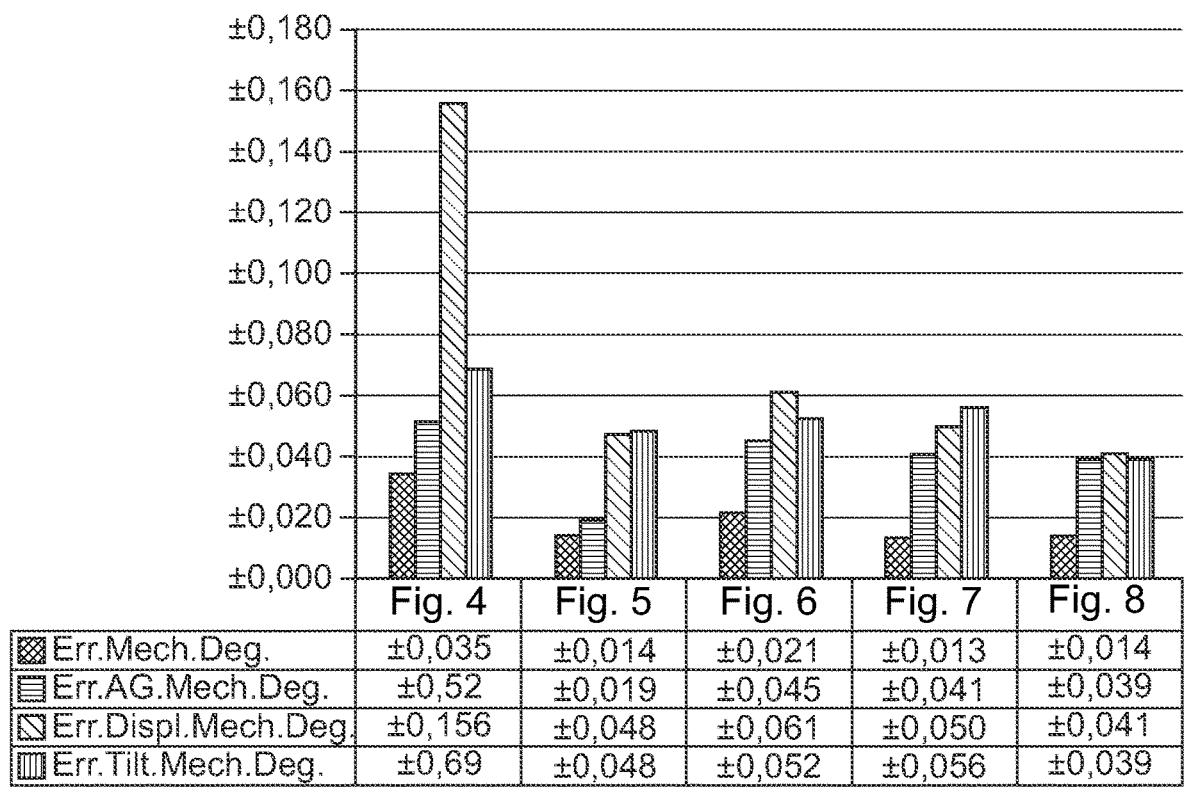

FIGS. 9*a* and 9*b* show a target configuration comparisons for:

a) Second embodiment of conductive moving target shown in FIG. 4
b) Third embodiment of conductive moving target shown in FIG. 5
c) Fourth embodiment of conductive moving target shown in FIG. 6
d) Fifth embodiment of conductive moving target shown in FIG. 7, and
e) Sixth embodiment of conductive moving target shown in FIG. 8.

The setup of the used comparison was:
Speed 1000 rpm
Nominal AG 1 mm . . . 1.75 mm
X/Y Displacement+/−0.3 mm
Tilt+/−0 . . . 0.5 mm
Different Targets were Tested FIGS. 9*a* and 9*b* show a performance comparison based on 32× coil.

There are different ways of signal processing to calculate the absolute high resolution angle signal. One possible method is shown below.

Step1: Calculate Divisor=(Resolution/#HighResolutionPeriods)

Step2: Check the actual period

ActualPeriod=Quotient(AbsoluteAngle/Divisor)

Step3: Calculate the High Resolution Absolute Angle

AbsHighres=HighresAngle+ActualPeriod*Resolution

Step4: Check Plausibility and correct period if needed

IF((AbsHighres−
 #HighResolutionPeriods*AngleLowRes))
 >Threshold−>Output=AbsHighres−Resolution

```
IF((AbsHighres-
    #HighResolutionPeriods*AngleLowRes))<-
    Threshold->Output=AbsHighres+Resolution ELSE Output=AbsHighres
```

Figure 10:
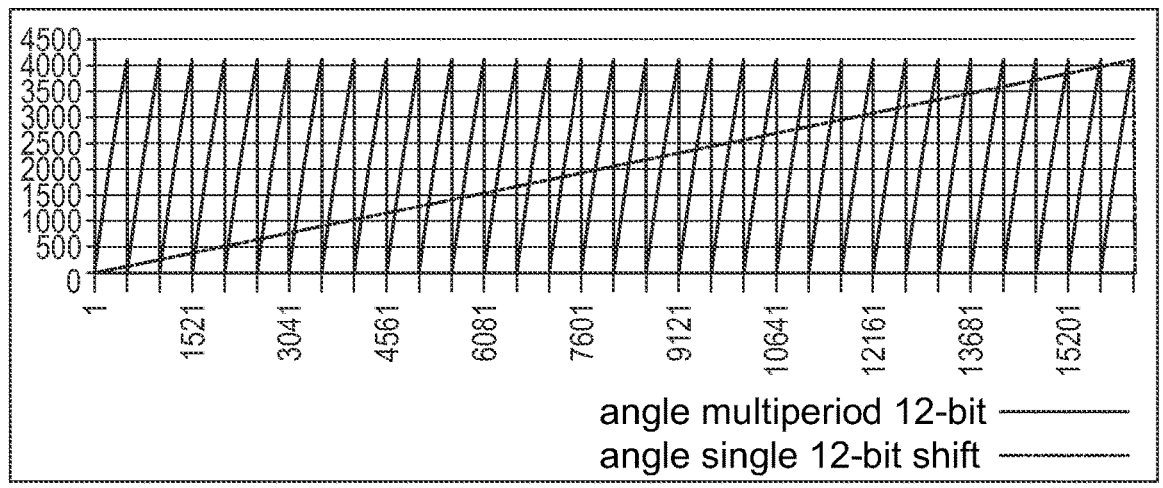
FIG. 10 outputs of an inductive position sensor according to the invention after signal processing.
Figure 10:
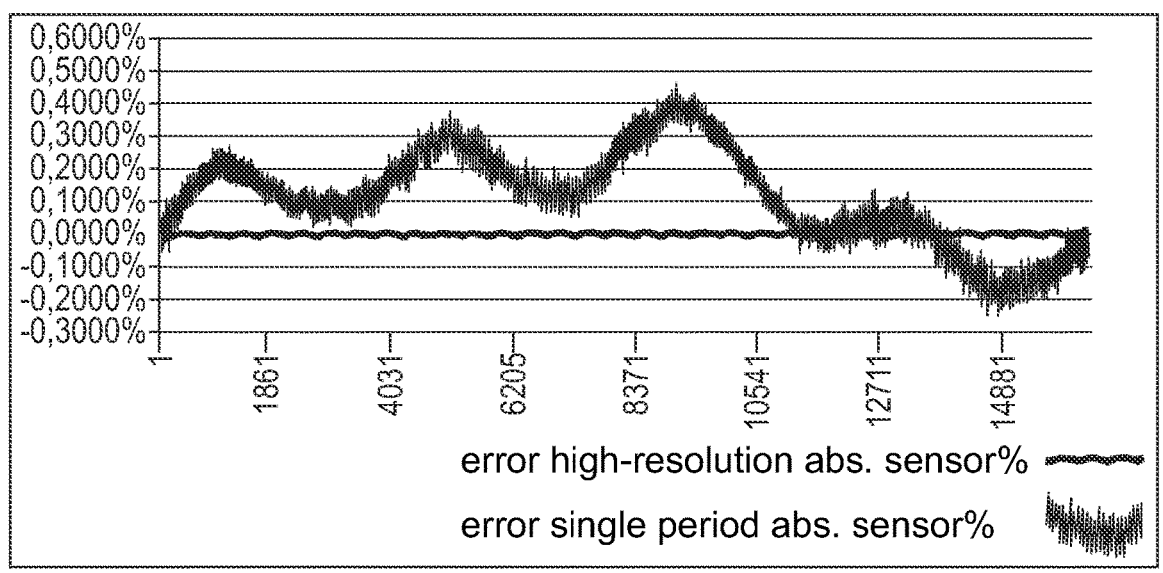
Figure 10:
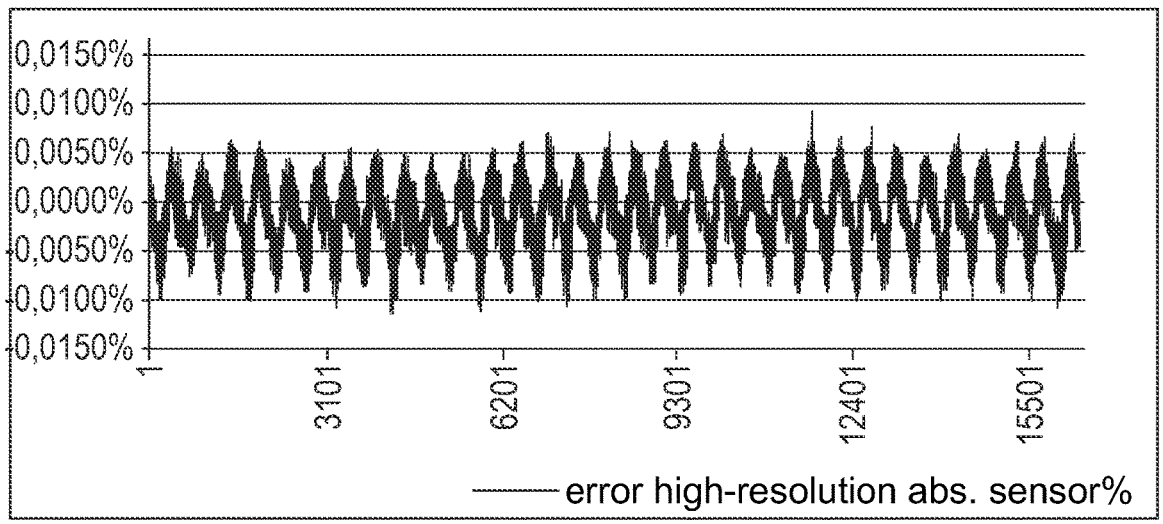

FIG. 10 shows a high-resolution output after processing, particularly signal plot of 32 periodic high-resolution sensor and processed high resolution absolute sensor.

By implementing two or more sets of the high-resolution absolute sensors on one PCB it is possible to generate a redundant solution for higher diagnostic coverage.

By implementing two sets of the high-resolution absolute sensors on each side of a torsion bar it is possible to calculate the torque as the difference between the two sensors.

Figure 11:
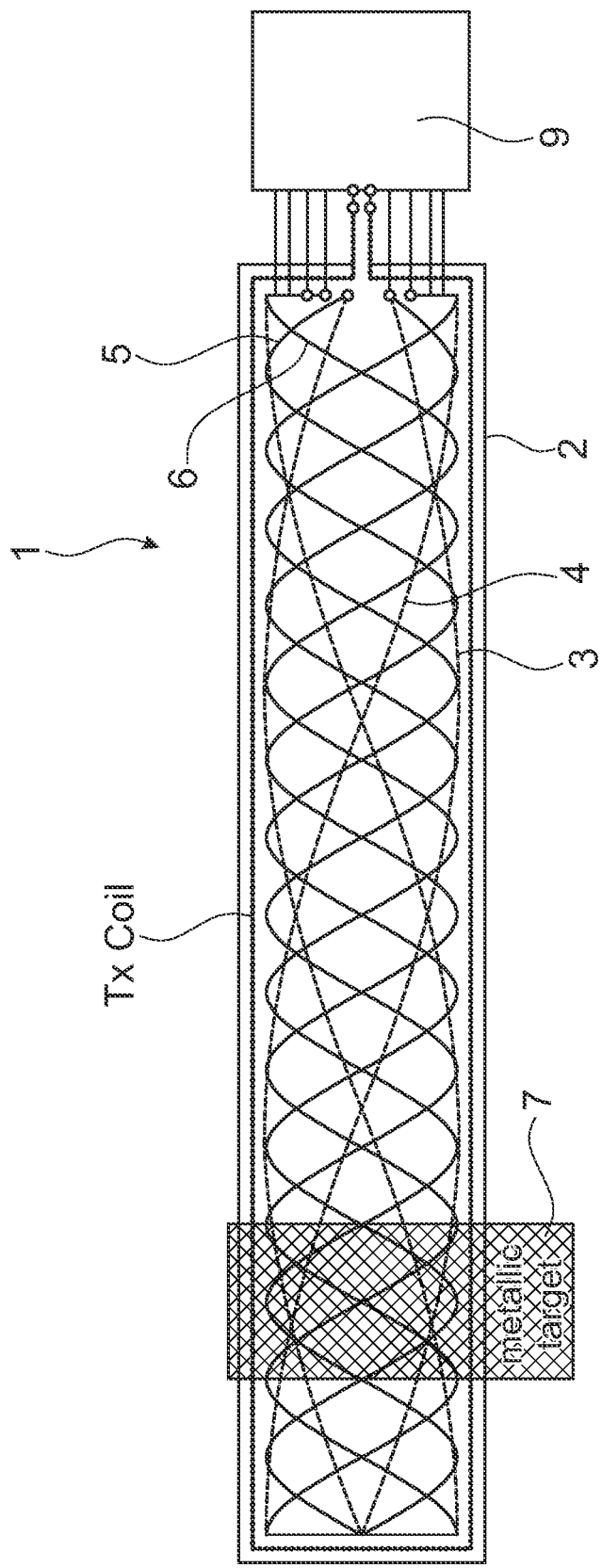
FIG. 11 a schematic view of a third embodiment of an inductive position sensor according to the invention.

FIG. 11 shows a schematic view of a third embodiment of an inductive position sensor 1 according to the invention. The inductive position sensor 1 shown in FIG. 11 is a linear position sensor with a straight measurement area, along which the conductive target 7 moves. Otherwise, the third embodiment of the inductive position sensor 1 shown in FIG. 11 corresponds to the first embodiment of the inductive position sensor 1 shown in FIG. 1.

What is claimed is:

1. An inductive position sensor comprising:
   at least one transmit coil, an absolute position receive coil pair, a high-resolution position receive coil pair and a conductive moving target,
   wherein the absolute position receive coil pair and the high-resolution receive coil pair together define a measurement area of the inductive position sensor and the moving target can move in this measurement area,
   wherein the absolute position receive coil pair has a first sine receive coil and a first cosine receive coil, both having one period over the measurement area of the inductive position sensor,
   wherein the high-resolution position receive coil pair has a second sine receive coil and a second cosine receive coil, both having at least two periods over the measurement area of the inductive position sensor, and
   wherein the absolute position receive coil pair and the high-resolution position receive coil pair are arranged in the same area of a printed-circuit board of the inductive position sensor,
   wherein the conductive moving target comprises at least one first target element and at least one second target element,
   wherein the shape of the at least one first target element is different to the shape of the at least one second target element,
   wherein the at least one first target element covers the complete measurement area of the inductive position sensor and the at least one second target element covers a part of the measurement area of the inductive position sensor,
   wherein the entire second target element overlaps a part of the first target element and has a different size than the first target element, and the second target element is a single element movable over the first target element.

2. The inductive position sensor according to claim 1, wherein the inductive position sensor is a radial position sensor and the measurement area is a 360° circle.

3. The inductive position sensor according to claim 1, wherein the inductive position sensor is a linear position sensor and the measurement area is a straight line.

4. The inductive position sensor according to claim 1, further comprising a signal processing unit, for providing a signal to the at least one transmit coil and/or for processing the signals of the absolute position receive coil pair and the high-resolution receive coil pair.

5. The inductive position sensor according to claim 4, wherein the signal processing unit is arranged on the same printed-circuit board as the inductive position sensor or externally connected to the printed-circuit board of the inductive position sensor.

6. The inductive position sensor according to claim 1, wherein the conductive moving target comprises multiple sections spaced apart from each other.

7. The inductive position sensor according to claim 6, wherein the multiple sections of the conductive moving target have the same shape and/or spacing.

8. The inductive position sensor according to claim 6, wherein at least one first target element comprises the multiple sections of the at least one first target element.

9. The inductive position sensor according to claim 1, wherein the at least one second target element has a semi-circular shape, an arc segment of a full ring shape, a rectangular shape or an arrow shape.

* * * * *